United States Patent [19]

Beneck et al.

[11] Patent Number: 4,981,640

[45] Date of Patent: Jan. 1, 1991

[54] NUCLEAR FUEL ASSEMBLY RECEPTION AND DISMANTLING CELL

[75] Inventors: Jean Beneck, Ormesson; Claude Quayre, Neuilly-Plaisance, both of France

[73] Assignee: Framatome, Courbevoie, France

[21] Appl. No.: 356,142

[22] Filed: May 24, 1989

[30] Foreign Application Priority Data

May 24, 1988 [FR] France .................................. 88 06860

[51] Int. Cl.$^5$ ........................................... G21C 19/33
[52] U.S. Cl. .................................................. 376/261
[58] Field of Search ............... 376/261, 260, 262, 272, 376/245; 29/723, 906, 426.1, 426.3, 426.4

[56] References Cited

U.S. PATENT DOCUMENTS

| | | | |
|---|---|---|---|
| 4,657,728 | 4/1987 | Coppa et al. | 376/261 |
| 4,723,359 | 2/1988 | Blissell et al. | 376/261 |
| 4,731,219 | 3/1988 | Beneck et al. | 376/261 |
| 4,793,962 | 12/1988 | Tsitsichvili | 376/261 |
| 4,822,554 | 4/1989 | Wood et al. | 376/261 |

*Primary Examiner*—Daniel D. Wasil
*Attorney, Agent, or Firm*—Pollock, Vande Sande & Priddy

[57] ABSTRACT

A vertical cell is provided for receiving a nuclear fuel assembly having a bundle of fuel rods retained at the nodes of a regular lattice and a skeleton formed of two end pieces connected together by tie rods and grids spaced apart along the tie rods. The structure of the cell has a cross-section corresponding to that of the assembly to be received and carries mechanisms for retaining the grids and the lower end piece, and a comb mechanism for holding the rods at their nominal spacing. The comb mechanism comprises at least two sets of combs carried by a frame fixed to the structure. The combs of each set are guided on the frame, and jacks move them towards and away from each other in a direction transversal to the movement of the combs of the other set. One of the grid retention mechanisms comprises jaws pivotably mounted on the structure and connected to simultaneous control jacks which move the jaws between a position in which they release the grid situated immediately below the comb mechanism and another position in which the jaws grip the grid on all sides thereof.

9 Claims, 8 Drawing Sheets

NUCLEAR FUEL ASSEMBLY RECEPTION AND DISMANTLING CELL

BACKGROUND OF THE INVENTION

1. Technical Field

The invention relates to a reception and dismantling cell for a nuclear fuel assembly of the type comprising a bundle of fuel rods retained at the nodes of a regular lattice by a skeleton formed of two end pieces connected together by tie rods and grids spaced apart along the tie rods.

When such fuel assemblies are removed from a reactor after irradiation, they must be stored in a swimming pool until the deactivation is sufficient to make it possible to remove the rods. It is desirable to reduce as much as possible the volume occupied by the elements of the assembly during deactivation so as to increase the storage capacity of the swimming pool.

2. Prior Art

An installation is already known (Beneck et al. U.S. Pat. No. 4,731,219) for separating a fuel assembly into a skeleton and rods, which form the most active elements, and consolidating the rods in the form of a bunch of jointing rods distributed according to a triangular lattice. The installation comprises a cell receiving the fuel assembly to be dismantled for successively removing an end piece then extracting the rods. The cell comprises a vertical structure with a cross-section corresponding to that of the assembly to be received, having mechanisms for retaining the grids and the lower end piece and a mechanism for holding the rods at their nominal spacing with combs movable between a position in which they are outside the assembly and a position in which the fingers of the combs are engaged between the rods, above the highest remaining grid after removal of the upper end piece.

SUMMARY OF THE INVENTION

An object of the invention is to provide a fuel assembly reception and dismantling cell for holding the assembly firmly in position, avoiding any risk of damaging the rods during separation of the upper end piece (generally by severing the tie rods formed by guide tubes) and avoiding jamming of the rods during subsequent extraction thereof.

To this end, the invention provides a fuel assembly reception and dismantling cell characterized in that the comb mechanism comprises at least two sets of combs carried by a frame solidly joined to said structure, the combs of each set being guided over the frame and having jacks for moving them toward and away from each other in a direction transversal to the move direction along which the combs of the other set move toward and away from each other. The grid retention mechanisms comprise jaws pivotally mounted on the structure and connected to jacks for simultaneous control, arranged for moving the jaws between a position in which they release the grid situated immediately below the comb mechanism and a predetermined position with respect to the structure in which the jaws grip the grid on all sides thereof.

With such an arrangement, the top ends of the fuel rods are held accurately in position at the nodes of a regular lattice when the unit formed of the upper end piece of the assembly, a section of the guide tubes separated by cutting and possibly the uppermost grid of the assembly, is withdrawn.

If the fuel assembly has a square cross-section and the rods are retained at the nodal points of a square lattice, the comb mechanism typically comprises two sets of orthogonally movable combs and the mechanism for retaining the highest grid remaining after removal of the upper end piece comprises two sets of two jaws, one of the sets at least having studs for engaging the grid and preventing upward movement thereof.

BRIEF DESCRIPTION OF THE DRAWINGS

The invention will be better understood from the following description of a cell which forms a particular embodiment thereof, given as a non-limitative example. The description refers to the accompanying drawings.

DESCRIPTION OF PREFERRED EMBODIMENTS

The dismantling cell 12 which will be described by way of example is intended to receive a fuel assembly of the type shown in FIG. 1, generally used at the present time in pressurized water reactors of 900 MWe. Such an assembly comprises a skeleton and a bundle of fuel rods 2 distributed at the nodal points of a square lattice. The skeleton is formed of two end pieces 3 and 4, joined together by guide tubes 6 which replace the rods at some of the nodes, and grids 8 spaced apart along the guide tubes. These grids, eight in number in the embodiment described, are fixed to the guide tubes and define passages for guiding and holding the rods in position.

Figure 2:
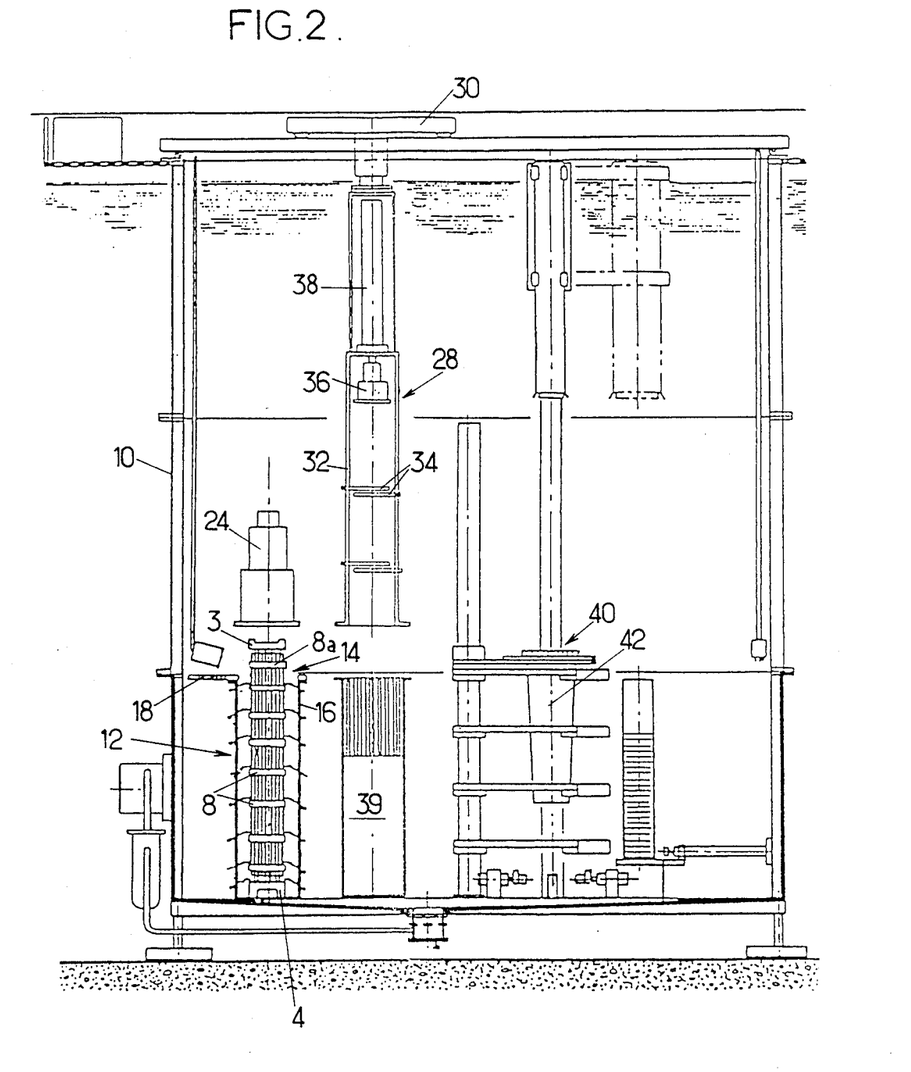
FIG. 2 is a schematical elevational view of a fuel assembly dismantling and rod compacting installation, comprising a dismantling cell according to one embodiment of the invention.

Cell 12 is particularly suitable for use in a dismantling installation having the general construction shown in FIG. 2, described in U.S. Pat. No. 4,731,219, to which reference may be made. This installation, placed in a swimming pool for receiving assemblies extracted from the core of a reactor, comprises a support cage 10. Cell 12 for receiving and dismantling an assembly 14 to be dismantled rests on the bottom of the structure. The cell comprises a rigid structure 12 carrying a comb mechanism 18 for holding the fuel rods in position at the nodes of the nominal spacing lattice and means for holding in position their lower end piece 4 and the grids.

The installation also comprises tools which are movable horizontally and vertically so that they can work on the assembly 14 placed in the dismantling cell.

Figure 3:
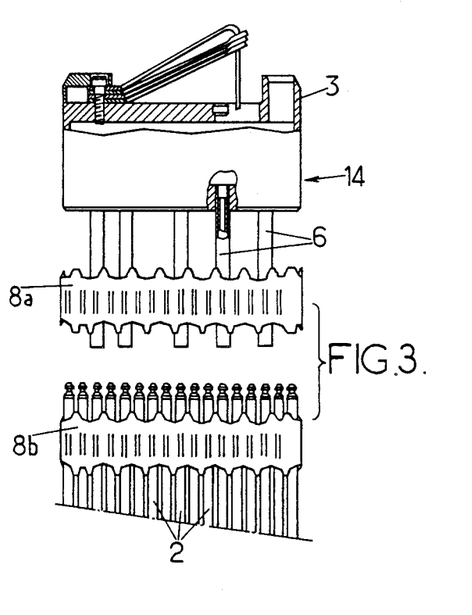
FIG. 3, similar to the top part of FIG. 1, shows a sub-assembly comprising the upper end piece separated from the rest of the assembly.

A cutting tool 24 is provided for cutting the guide tubes 6 joining end pieces 3 and 4 together below the level of the upper grid 8a (FIG. 3) and for withdrawing the assembly formed of end piece 3, the cut-out sections of the guide tubes 6 and the upper grid 8a.

A gripping tool 28, suspended from a carriage 30, makes it possible to extract the rods and to handle them. Tool 28 as shown comprises a frame work 32 for vertical guidance of the rods, having combs 34, which may be of the type described in FR-A-2 460 027. Head 36 is movable vertically within the frame work 32 by a jack 38.

The installation shown in FIG. 2 further comprises a quiver 39 for the defective rods and a regrouping or consolidation cell 40 having a pyramidal quiver 42 for regrouping the rods in a bunch.

Figure 4:
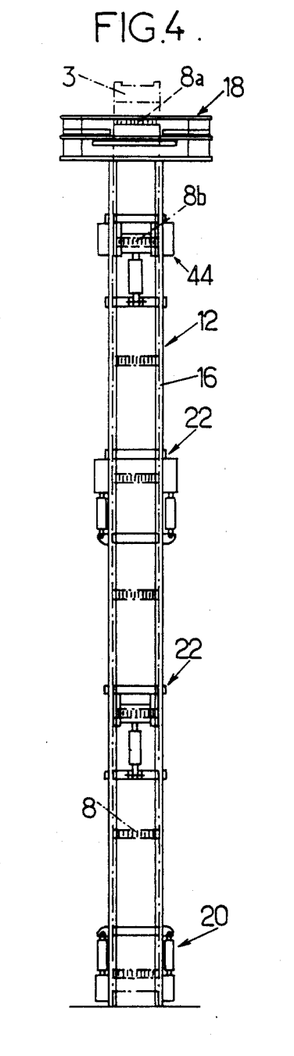
FIG. 4 is a schematical elevational view of the cell.

In the dismantling cell of the invention shown schematically in FIG. 4, structure 16 has a square cross-section and is formed of angle sections assembled together by frames. Its height is such that the upper end piece 3 is above the cell when the assembly is in position. Structure 16 carries, from bottom to top:

the mechanism 20 for fixing and centering the lower end piece of the assembly 14 contained in the cell;
mechanisms 22 for only holding two grids of the assembly in position;
a mechanism 44 for holding and centering the grid 8b of the assembly which is highest, after removal of the assembly comprising the upper end piece; and
the mechanism 18 with two sets of combs, for maintaining the upper ends of the rods at their nominal spacing, and which is carried by the upper end of the structure.

The different mechanisms mentioned above will now be described.

Comb mechanism (FIGS. 5 to 8)

Figure 5:
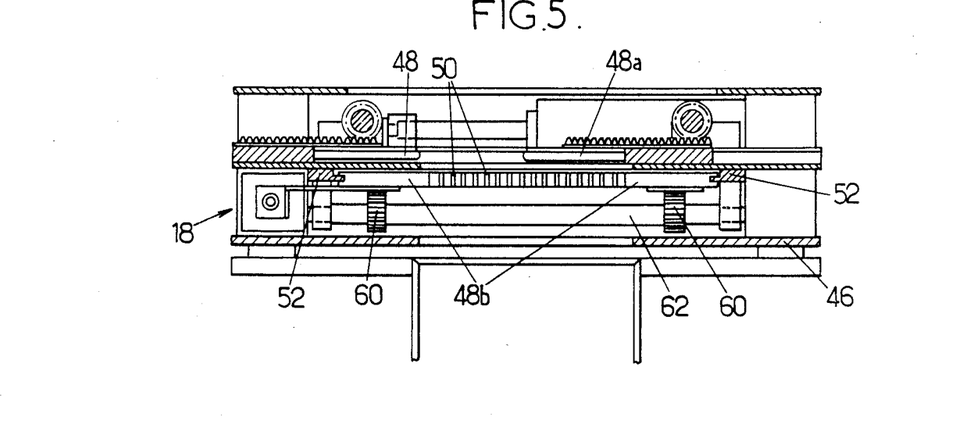
FIGS. 5 and 6 show, respectively in cross-section through line V—V of FIG. 6 and in plan view the comb mechanism of the cell shown in FIG. 4.
Figure 6:
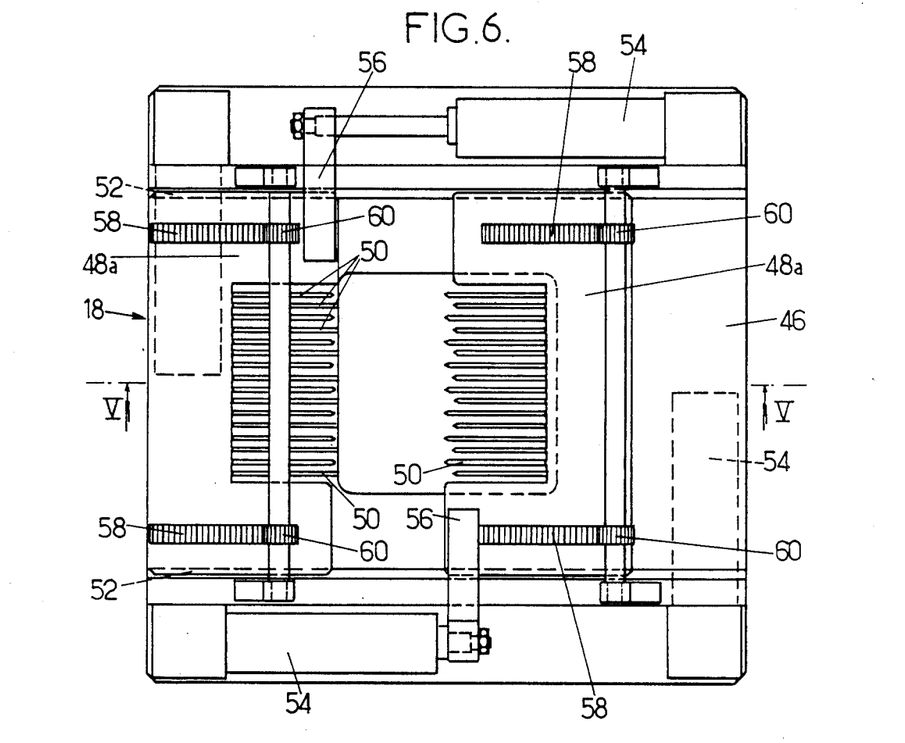

FIGS. 5 and 6 show the entire comb mechanism 18. For the sake of clarity, only one of the combs is shown in inserted position, whereas actually opposite combs move simultaneously.

Mechanism 18 comprises a frame 46 with two stages each allotted to a set of two opposite combs. The upper set is formed of two combs 48a moving horizontally in the plane of the figure between a position in which they are spaced apart and a maximum insertion position in which the teeth 50 of the combs are practically in contact. In the embodiment shown in FIG. 6, the teeth 50 of each comb have a length corresponding to the half width of the rod bundle. Each comb 48a slides over two guide ramps 52 formed on the frame. Means for simultaneously moving the two combs 48a comprise two fluid pressure jacks 54, whose cylinder is carried by the frame 46 and whose piston is connected to one of the two combs by a cross-piece 56. To provide smooth and even movement of combs 48a and to avoid jamming thereof, each comb has two lateral racks 58 which mesh with corresponding pinions 60 on a common shaft 62 rotating in bearings fixed to frame 46.

Combs 48b of the lower set are mounted and actuated in the same way as combs 48a, but the movements of the combs of one set take place orthogonally to those of the combs of the other. For the sake of simplicity, the same reference numbers have been used in FIG. 5 for designating the corresponding elements associated with combs 48a and 48b.

Figure 7:
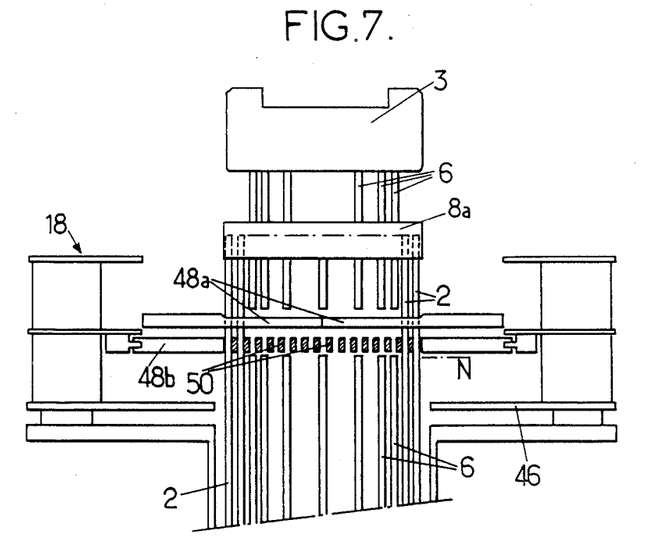
FIGS. 7 and 8 are diagrams showing the mutual arrangement of the combs of the mechanism, when they are inserted in an assembly, respectively in elevation and in plan view.
Figure 8:
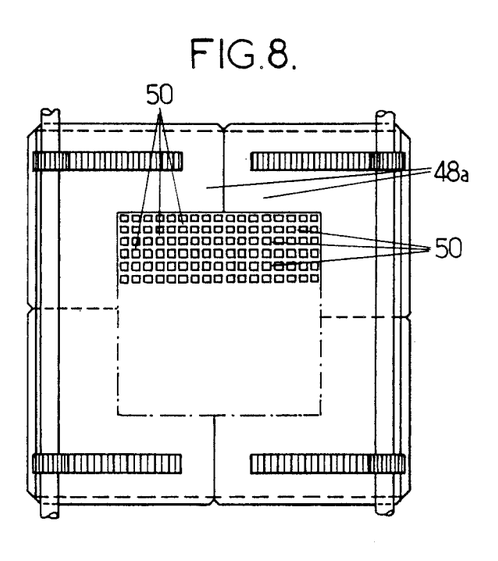

Referring to FIG. 7, where only a few rods 2 have been shown, frame 46 is fixed to a top flange of structure 16 at a level such that the combs 48a and 48b are inserted between the rods just above the level N where the guide tubes 6 are cut. With this arrangement, a checker pattern of passages is obtained, shown in FIG. 8, immediately below the position where the rods will be gripped by the means for removing them.

Lower end piece fixing and centering mechanism

Figure 9:
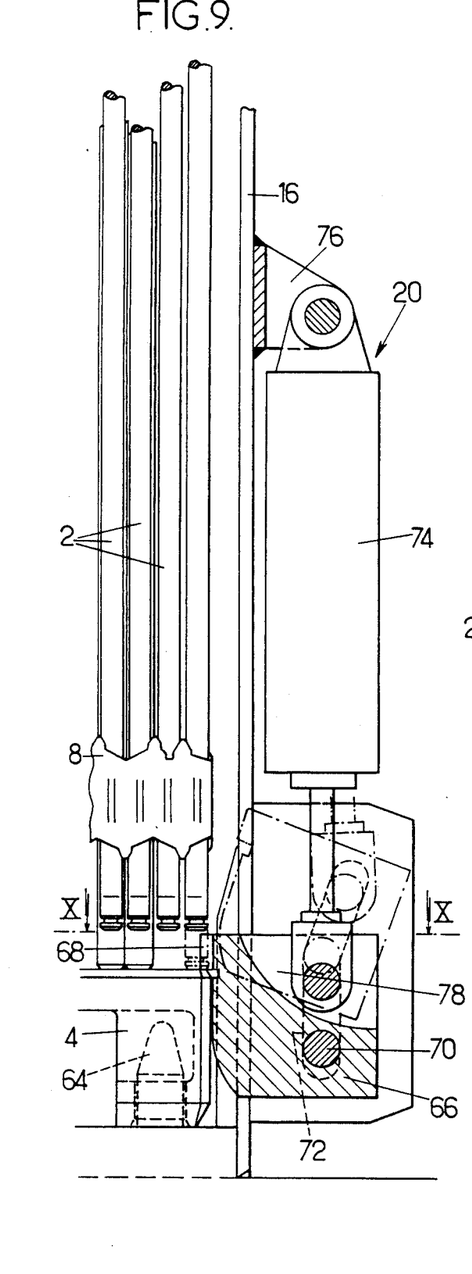
FIG. 9 is an elevational and partial cross-sectional view along a vertical plane showing a fraction of the mechanism for fixing and centering the lower end piece in the cell of FIG. 4.
Figure 10:
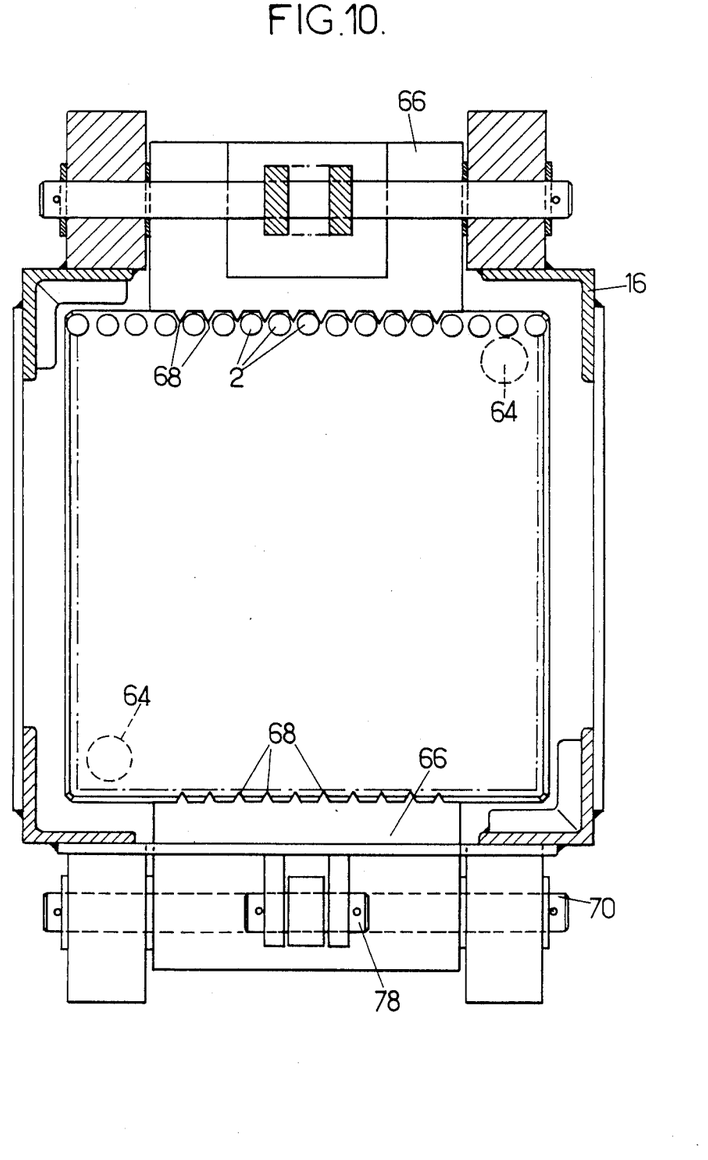
FIG. 10 is a top plan view of the mechanism of FIG. 9, partially in section along line X—X.

Mechanism 20 shown in FIGS. 9 and 10 comprises two centering studs 64 carried by the bottom of structure 16 for engagement in recesses of corresponding shape in the lower end piece 4. The mechanism again comprises a single set of jaws 66 acting on two opposite faces of end piece 4 and disposed symmetrically with respect to this end piece. Each jaw 66 is movable between a position for clamping the end piece 44 (shown in continuous lines in FIG. 9) and a position in which it releases this end piece, (shown in dash-dot lines). Each jaw has a bearing face allowing it both to hold end piece 4 firmly in position and to center it. In the embodiment shown in FIGS. 9 and 10, the bearing face of each jaw 66 is provided with studs 68 which pass between the adjacent fuel rods 2, bear against the upper face of end piece 4 and prevent it from moving upwardly.

Jaws 66 are guided during their movement by pins 70 fixed to the jaws and imprisoned in elongate holes 72 in structure 16. The movements of the jaws are controlled by respective jacks 74 (FIG. 9) whose cylinder is pivotally mounted to a lug 76 belonging to structure 16 and whose piston is connected to a shaft 78 passing through the jaws 66.

Figure 11:
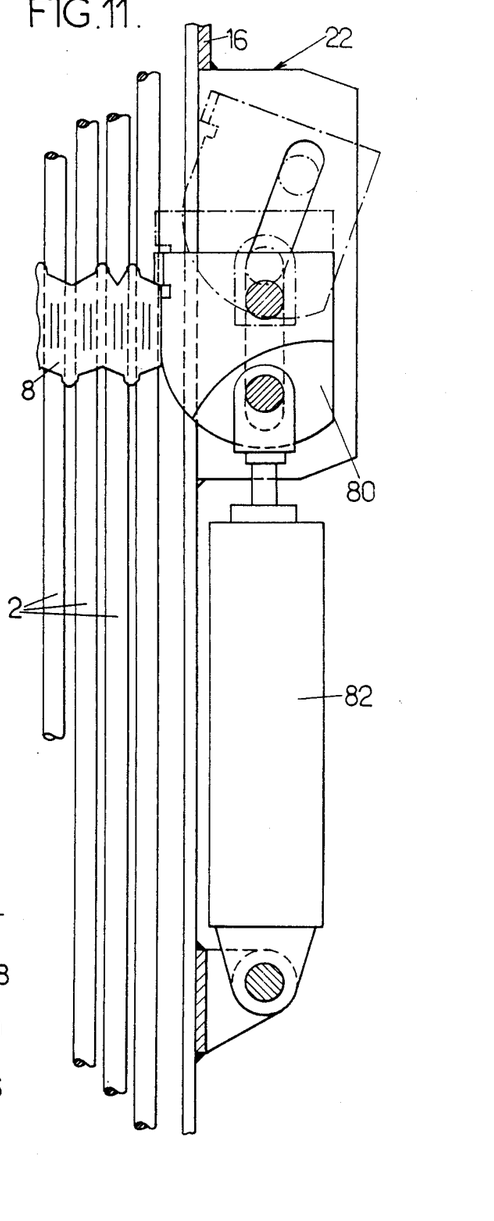
FIGS. 11 and 12, similar to FIGS. 9 and 10, show a fraction of one of the grid holding mechanisms, respectively in elevation with partial section and in plan view.
Figure 12:
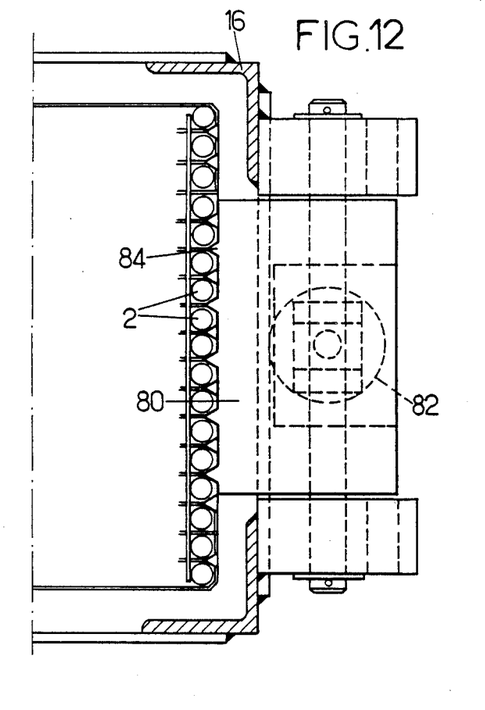

Grid holding mechanism (FIGS. 11 and 12)

The cell shown in FIG. 4 comprises two mechanisms 22 for simply holding in position two current grids 8 of the assembly, to which is added a mechanism for holding and centering the uppermost grid 8b which will be described further on.

Figure 13:
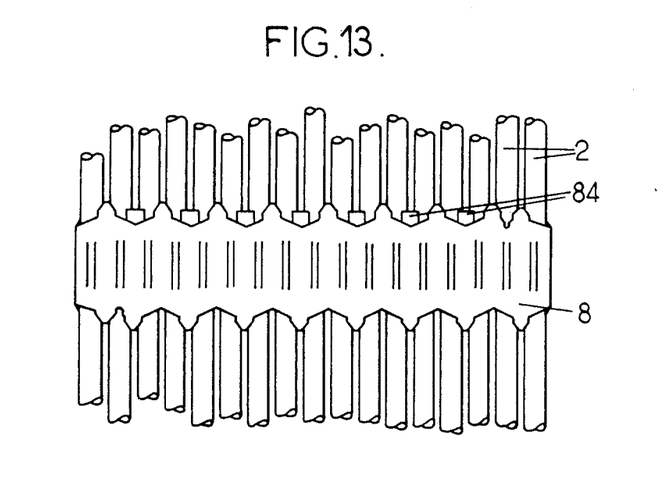
FIG. 13 is a front view of a grid showing the bearing points of the respective holding mechanism on the grid.

The two simple holding mechanisms 28 each grip a grid on two faces only. The lower mechanism 22, for example, grips the third grid from the bottom on two faces parallel to the plane of FIG. 4, and the other mechanism 22 grips the fifth grid from the bottom, on the two faces perpendicular to the plane of FIG. 4. The two mechanisms 22 are identical. The one shown in FIGS. 11 and 12 has a construction very similar to that of mechanism 20: it also comprises two jaws 80 each movable between a clamping position and a release position by a jack 82. Each jaw 80 has a flat face for bearing on grid 8 and studs 84 of triangular cross-section engaged in the free spaces between the fuel rods 2 so as retain the grid axially. The bearing points for studs 84 may have the arrangement shown schematically in FIG. 13 for one of the jaws 80, an arrangement offset by the distance between two successive rods for the other jaw. Thus, each grid 8 is retained at fourteen points.

Figure 14:
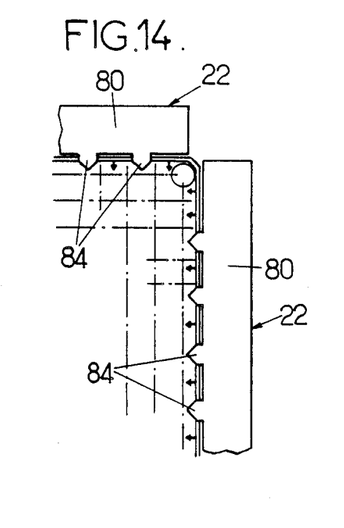
FIG. 14 is a diagram showing the relative arrangement of the bearing points of two holding mechanisms on two successive grids.

In the cell 12 shown in FIG. 4, the lower mechanism 22 grips the grid 8 on two faces orthogonal to the faces gripped by mechanism 20 for fixing and centering the lower end piece and orthogonal to the faces gripped by the other mechanism 22. Thus a distribution of the engagement studs is obtained which is as shown schematically in FIG. 14 and guarantees a firm holding.

Mechanism for holding and centering the uppermost grid

Figure 1:
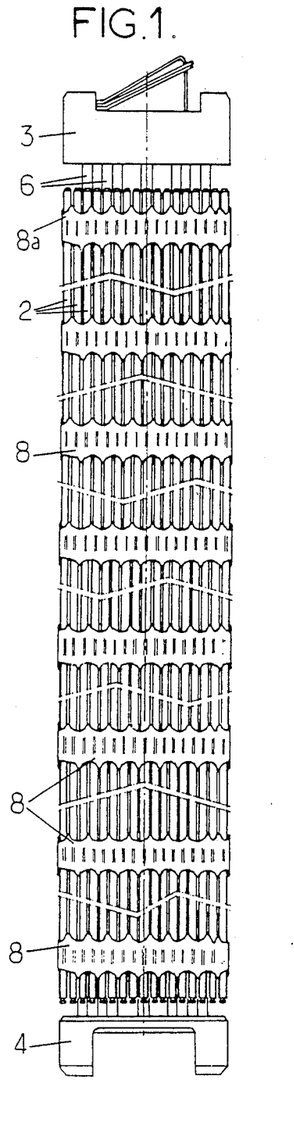
FIG. 1 is an elevational view of a fuel assembly adapted to be received in a dismantling cell according to the invention.

The mechanism 44 for holding and centering the uppermost grid 8b (seventh grid from the bottom in the case of the assembly shown in FIG. 1) is provided for gripping the grid on its four faces. It may have the construction shown in FIGS. 15 and 16, with two jacks 88 only, located opposite each other and arranged for moving two sets of jaws 86 and 87 mutually opposed in sets of two. The means for guiding the jaws will not be described, for they may have exactly the same construction as those already illustrated in FIGS. 9 and 11. Simultaneous control of the four jaws is obtained by fixing the pistons of the two jacks 88 to the same mobile horizontal plate 92 which surrounds the structure and which carries vertical links 90 provided with pins 94 for pivotal movement of the jaws. In the embodiment illustrated, the jaws 86 of one only of the two sets are provided with retention studs 96.

Figure 15:
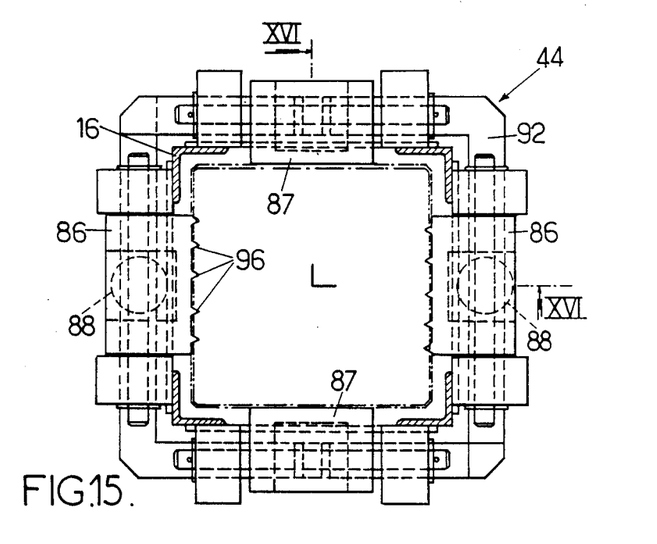
FIGS. 15 and 16 show, respectively in plan view and in section along line XVI—XVI of FIG. 15, the mechanism for holding and centering the uppermost grid remaining in the cell.
Figure 16:
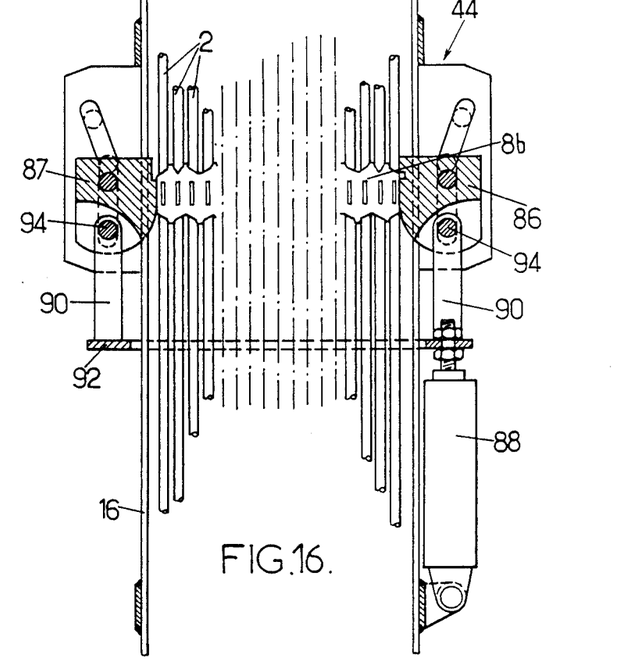

The action of jaws 86 and 87 on the four faces of grid 8b straightens up the fuel assembly should deformation of the assembly have caused flexure of the rods or twisting.

A cell according to the invention may be provided for fuel assemblies different from that shown in FIG. 1, for example for assemblies for a 1300 MWe reactor comprising an increased number of grids. The different mechanisms described may again be used. All mechanisms are of simple construction and yet guarantee transverse and longitudinal holding of the lower end piece and of the grids and holding of the rods in position at the nodal points of a given lattice, thus avoiding any risk of jamming during extraction thereof. Means similar to those which have been described could be used for dismantling an assembly having a hexagonal rather than square cross-section and rods distributed at the nodal points of a triangular lattice.

The method of using the cell is clear from the above description and therefore need not be described in detail. The fuel assembly to be dismantled is lowered into the cell while suspended from a handling tool, the jaws of the different mechanisms and the combs being spaced apart. The lower end piece 4 is centered on studs 64 at the end of its downward movement. Jacks 74 of mechanism 20 are actuated for moving jaws 66 close toward each other and gripping the end piece 4 on two faces. The grid holding mechanisms 22 and 44 are then brought into action; these mechanisms prevent the grids from being deformed during extraction of the fuel rods by facilitating sliding thereof. The guide tubes are severed below the level of the top grid 8a and the subassembly comprising this grid and the upper end piece 3 is removed. Finally, the combs of mechanism 18 are moved toward each other so as to hold the upper ends of the fuel rods in position at the nodes of their nominal distribution lattice.

What is claimed is:

1. A cell for receiving and dismantling a nuclear fuel assembly comprising a bundle of fuel rods retained at the nodal points of a regular lattice by a skeleton formed of a lower end piece and an upper end piece connected together by tie rods and of a plurality of grids spaced apart along the tie rods, said cell comprising:
    a vertical structure having an internal cross-section sized to receive a fuel assembly;
    a plurality of gripping mechanisms each for retaining a respective one of the grids and lower end piece of said fuel assembly; and
    a comb mechanism for holding the fuel rods of the fuel assembly at their normal spacing in the regular lattice, said comb mechanism comprising at least two sets of combs, the combs of each of said sets being movable with respect to the structure between a first position in which they are outside a fuel assembly located within the structure and a second position in which fingers of the combs are engaged between the rods, above one of said grids which is uppermost after removal of an upper portion of said skeleton,
    wherein the combs of each set are carried by and guided on a frame securely connected to said structure, and are operatively connected to jack means arranged for moving them toward and away from each other between said first and second position in a direction transverse to the movement of the combs of the other of said sets,
    and wherein one of said gripping mechanisms comprises a plurality of jaws mounted on the structure and connected to additional jack means for moving the jaws simultaneously away from each other to a position with respect to the structure in which they release said uppermost grid and toward each other into a predetermined position with respect to the structure in which the jaws grip and clamp all sides of said uppermost grid and center said uppermost grid with respect to said structure.

2. A cell for receiving and dismantling a nuclear fuel assembly having a square cross-section comprising a bundle of fuel rods retained at the nodal points of a regular square lattice by a skeleton formed of a lower end piece and an upper end piece connected together by tie rods and of a plurality of grids spaced apart along the tie rods, said cell comprising:
    a vertical structure having an internal cross-section sized to receive a fuel assembly;
    a plurality of gripping mechanisms each for retaining one of the grids and lower end piece of said fuel assembly; and
    a comb mechanism for holding the fuel rods of the fuel assembly at their normal spacing in the regular square lattice, said comb mechanism comprising two sets of combs, the combs of each of said sets being movable with respect to the structure orthogonally to the combs of the other set between a first position in which they are outside a fuel assembly located within the structure and a second position in which fingers of the combs are engaged between the rods, above one of said grids which is uppermost after removal of an upper section of said skeleton,
    wherein the combs of each set are carried by and guided on a frame securely connected to said structure, and are operatively connected to jack means arranged for moving them toward and away from each other rectilinearly between said first and second position in a direction transverse to the rectilinear movement of the combs of the other of said sets, and wherein one of said gripping mechanisms comprises a plurality of jaws pivotally mounted on the structure and connected to additional jack means for moving the jaws simultaneously between a position with respect to the structure in which they release the uppermost grid and a predetermined position with respect to the structure in which the jaws grip all sides of said uppermost grid, said jaws of said gripping mechanism having projections for engaging an upper edge of said uppermost grid between mutually adjacent ones of said fuel rods and preventing upward movement thereof.

3. Cell according to claim 1, wherein the jaws of the gripping mechanisms are controlled by two opposed jacks via a same plate connected to said jacks and surrounding said structure.

4. Cell according to claim 2, further comprising means for retaining and centering the lower end piece of said fuel assembly in said structure, said means having centering studs carried by a bottom part of the structure and a single additional set of two jaws arranged to clamp two opposed faces of the lower end piece, said jaws being operatively connected to a jack for movemet thereof between a position in which the jaws clamp the lower end piece and a position in which the jaws release the lower end piece.

5. Cell according to claim 4, wherein the jaws of said means for retaining and centering the lower end piece and the jaws of the grid holding mechanisms act on alternate sets of two opposed faces along the fuel assembly, 6. Cell according to claim 1, wherein each of the jaws is guided in its movements by pins fixed to the structure and retained in elongate holes in the jaws and the jaws are actuated by jacks via hinged connections.

7. Cell according to claim 1, wherein said combs are each carried by a slide formed on the frame and have respective drive jacks and each comb carries lateral racks meshing with pinions carried by a common shaft so as to cause smooth and even movement of the comb.

8. Cell according to claim 1, having a height proportioned to that of the fuel assembly to be received so that the upper end piece and the grid of the assembly which is closest to the upper end piece are above the structure whereby the tie rods can be cut below the uppermost grid and a sub-assembly to be removed formed by the upper end piece, the said grid closest to the upper end piece and upper sections of the tie rods above the cut.

9. A cell for receiving and dismantling a nuclear fuel assembly comprising a bundle of fuel rods retained at the nodal points of a regular lattice by a skeleton formed of a lower end piece and an upper end piece connected together by tie rods and of a plurality of grids spaced apart along the tie rods, said cell comprising:

a vertical structure having an internal cross-section sized to receive a fuel assembly;

a plurality of gripping mechanisms each for retaining a respective one of the grids and lower end piece of said fuel assembly; and a comb mechanism for holding the fuel rods of the fuel assembly at their normal spacing in the regular lattice, said comb mechanism comprising at least two sets of combs, the combs of each of said sets being movable with respect to the structure between a first position in which they are outside a fuel assembly located within the structure and a second position in which fingers of the combs are engaged between the rods, above one of said grids which is uppermost after removal of an upper portion of said skeleton, wherein the combs of each set are carried by and guided on a frame securely connected to said structure, and are operatively connected to jack means arranged for moving them toward and away from each other between said first and second position in a direction transverse to the movement of the combs of the other of said sets, wherein one of said gripping mechanisms comprises a plurality of jaws pivotally mounted on the structure and connected to additional jack means for moving the jaws simultaneously between a position with respect to the structure in which they release said uppermost grid and a predetermined position with respect to the structure in which the jaws grip all sides of said uppermost grid, and wherein the gripping mechanisms further comprise at least one mechanism for retaining a grid other than the uppermost grid, having a single set of two additional jaws pivotally mounted on the structure and connected to individual control jacks for simultaneously moving the additional jaws of said gripping mechanism between a position in which the jaws engage one side of the grid and a position in which they release said one side, said additional jaws having projections located for retaining said other grid by insertion between adjacent rods and engagement of an upper edge of the grid, whereby they retain said other grid.

* * * * *

UNITED STATES PATENT AND TRADEMARK OFFICE
CERTIFICATE OF CORRECTION

PATENT NO. : 4,981,640

DATED : January 1, 1991

INVENTOR(S) : Beneck et al

It is certified that error appears in the above-identified patent and that said Letters Patent is hereby corrected as shown below:

On the title page: Item [75] Inventors:

The middle name of the first inventor is missing and should be corrected to read -- Jean A. Beneck --.

Signed and Sealed this

Twentieth Day of April, 1993

*Attest:*

MICHAEL K. KIRK

*Attesting Officer*      *Acting Commissioner of Patents and Trademarks*